UNITED STATES PATENT OFFICE.

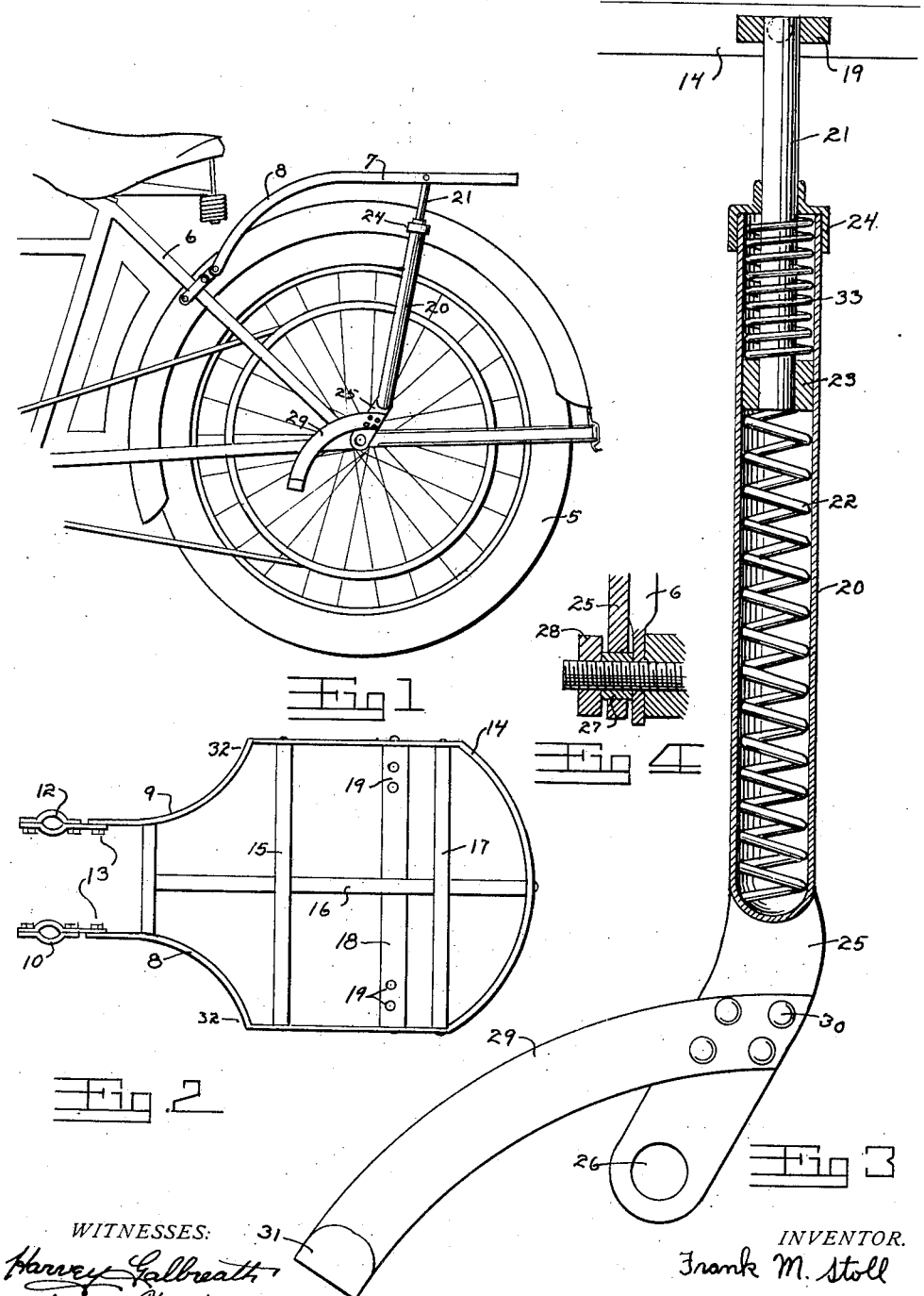

FRANK M. STOLL, OF DENVER, COLORADO.

CUSHION-SEAT FOR MOTOR-CYCLES.

1,095,172. Specification of Letters Patent. Patented Apr. 28, 1914.

Application filed October 17, 1912. Serial No. 726,320.

*To all whom it may concern:*

Be it known that I, FRANK M. STOLL, a citizen of the United States, residing in the city and county of Denver and State of Colorado, have invented new and useful Improvements in Cushion-Seats for Motor-Cycles; and I do declare the following to be a full, clear, and exact description of my invention, such as will enable others skilled in the art to which it appertains to make and use the same, reference being had to the accompanying drawing, and to the figures of reference marked thereon, which form a part of this specification.

My invention relates to improvements in cushion seats for motor cycles and has for its object the provision of a simple, effective and inexpensive seat, more especially adapted to form the rear seat of a motor-cycle.

Another object of my invention is to provide a device of the character specified, constructed to effectively absorb all shocks and jars incident to the traveling of the vehicle over rough ground.

Another object of my invention resides in the shape and design of the seat throughout, whereby the seat is made peculiarly adaptable to the comfort of the rider.

In the use of my invention, many other objects and advantages embodied in the construction and arrangement of the invention will readily appear, and I wish it understood that all such objects and advantages are anticipated by me and within the scope of my invention.

I will now proceed to describe my invention with reference to the accompanying drawing, forming a part hereof.

In this drawing,—Figure 1 is a side elevation of the rear part of a motor-cycle showing my improved seat mounted thereon, the seat being also in side elevation; Fig. 2 is a bottom view of my improved seat; Fig. 3 is a detail view showing the manner in which the seat is yieldingly supported in position on the motor-cycle frame, a foot rest being also shown in this detail view; Fig. 4 is a detail view illustrating the manner in which the seat is pivotally connected with the rear axle of the motor-cycle.

Corresponding and like parts are referred to in the following description and indicated in all of the views of the accompanying drawing by the same reference characters.

Let the numeral 5 designate the rear wheel of a motor-cycle, and the numeral 6 the rear fork thereof.

7 designates the seat proper, having forwardly located downwardly curved arms 8 and 9, which are respectively pivoted to collars 10 and 12, as shown by the reference character 13. These two collars 10 and 12 are secured to the two members of the upper part of the rear fork of the motor-cycle. As more clearly shown in Fig. 2 of the drawing, the seat 7 is composed of a frame work braced by means of transverse bars 15, 16 and 17. A transverse member 18 is journaled in the opposite sides of the frame work 14 and is provided with perforations 19 near its opposite extremities. The seat 7 is yieldingly supported from the rear axle of the motor-cycle by means of cylinders 20 and spring actuated pistons 21, the said pistons being arranged in the cylinders in engagement with springs 22, which springs engage the bottom of the cylinders, while the lower extremities of the pistons 21 are engaged by the upper extremities of said springs, the lower extremities of the said piston being provided with collars or bushings 23, which closely fit the interior of the cylinders. The top of the cylinders are provided with perforated caps 24 through which the pistons 21 pass, the said caps 24 serving to close the top of the cylinders against the entrance of foreign substances therein. The upper extremities of the pistons 21 are received in the perforations 19 of the member 18, while the lower extremities of the cylinders 20 are provided with flat parts 25, extending slightly forward and having perforations 26 at their lower extremities, which receive bushings 27 mounted upon the opposite extremities of the rear axle of the motor-cycle. Thus it will be seen that the cylinders 20 are journaled upon the rear axle of the motor-cycle, while the upper extremities of the pistons 21 are pivotally connected with the frame work 14 of the seat, through the medium of the member 18, the member 18 being journaled at its opposite extremities in said frame work 14, as heretofore explained. The cylinders 20 are held in position upon the rear axle of the motor-cycle by means of nuts 28 threaded upon the extremities of the said axle. The flat parts 25, which form an extension of the lower extremities of the cylinders 20, have connected therewith sector shaped depending members 29, the said members 29 being secured at one extremity, to the said parts 25, by means of bolts or rivets 30. These sector shaped parts 29 are curved downwardly and their lower extremities are provided with right angular parts 31, which form foot rests for the rider. The forward part of the frame work 14 of the seat 7 is curved inwardly on opposite sides, as shown at 32, for the reception of the legs of the rider, making the seat adaptable in this respect to comfort. On the interior of the cylinders 20, surrounding the pistons 21, about the bushings 23, I arrange rebound spiral springs 33, the lower extremities of which engage the bushings 23, while their upper extremities engage the collars 24.

Now, from the foregoing description it will be readily seen that the weight of the rider is opposed by virtue of the springs 22 acting upon the pistons 21, the said springs 22 accomplishing the purpose of absorbing all shocks and jars incident to the traveling of the vehicle over rough ground, the forward pivot of the seat 7 permitting the latter to oscillate in an arc against the tension of the springs 22. By virtue of the fact that the forward part of the seat 7 is curved downwardly to its pivot, the said seat is given a relatively shorter arc in which to oscillate and is thus constantly maintained in a nearly horizontal position. This construction of the seat also enables the latter to be set closer to the periphery of the rear wheel of the vehicle.

Attention is here called to the fact that the opposite extremities of the member 18 are each provided with two perforations 19, whereby the distance between the two cylinders 20 may be extended or shortened according to the width of the frame work of the motor-cycle to which it is desired to apply my improved seat. In other words, assuming that it is desired to apply the seat to a relatively narrow motor-cycle frame work, the upper extremities of the pistons 21 may be inserted into the perforations farthest inwardly, while when it is desired to apply the seat to a relatively wider motor-cycle frame work, the upper extremities of the pistons 21 may be inserted into the perforations farthest outwardly.

Many advantageous functions and objects incident to the effective operation of the seat and to the comfort of the rider are accomplished by virtue of the detail construction and arrangement of the seat, and I therefore wish it understood that my invention resides considerably in the detail construction and arrangement.

While I have described and illustrated herein a specific form of my invention, it is understood that I am not limited thereto and that the same may be modified and varied without departing from the spirit of my invention or the domain of the appended claims.

Having thus described my invention, what I claim and desire to secure by Letters Patent is:—

1. A vehicle seat, having a support pivotally mounted on the vehicle, the forward extremity of said seat being curved downwardly toward the pivot of said support and pivotally connected with the frame work of the vehicle, and a spring interposed between said support and the seat.

2. A motor-cycle seat, comprising a seat proper, cylinders pivotally connected with the motor-cycle frame work, springs arranged within said cylinders, pistons also arranged within said cylinders and engaging said springs, the pistons being pivotally connected with the seat proper, and the forward extremity of said seat proper being curved downwardly toward the point where said cylinders are pivoted and pivotally connected with the frame work of the motor-cycle.

3. A vehicle seat, comprising a seat proper, cylinders pivotally connected with the vehicle frame work, springs arranged within said cylinders, pistons also mounted in said cylinders and engaged by said springs, the said pistons being pivotally connected at their upper extremities with the seat proper, the forward extremity of said seat proper being curved downwardly toward the pivot of said cylinders and pivotally connected with the frame work.

4. A motor-cycle seat, comprising a seat proper, cylinders pivotally connected with the rear axle of the motor-cycle, springs arranged within said cylinders, pistons also received in said cylinders and engaged by said springs, the seat proper having a transverse member journaled thereon, the upper extremities of said pistons being connected with said transverse member, and the forward extremities of said seat proper being curved downwardly toward the point where said cylinders are pivoted and pivotally connected with the frame work of the motor-cycle.

5. A motor-cycle rear seat, comprising a seat proper, cylinders having relatively flat parts at their lower extremities, said parts being pivotally connected with the rear axle of the motor-cycle, spring actuated pistons arranged within said cylinders, the upper extremities of said pistons being pivotally connected with the seat proper, the forward extremity of said seat proper being curved downwardly toward the point where said cylinders are pivoted and pivotally connected with the motor-cycle frame work, and downwardly curved members connected with said relatively flat parts of the cylinders and forming foot rests, substantially as described.

In testimony whereof I affix my signature in the presence of two witnesses.

FRANK M. STOLL.

Witnesses:
 JNO. G. POWELL,
 ALVINA HINTERMEISTER.

Copies of this patent may be obtained for five cents each, by addressing the "Commissioner of Patents, Washington, D. C."